UNITED STATES PATENT OFFICE.

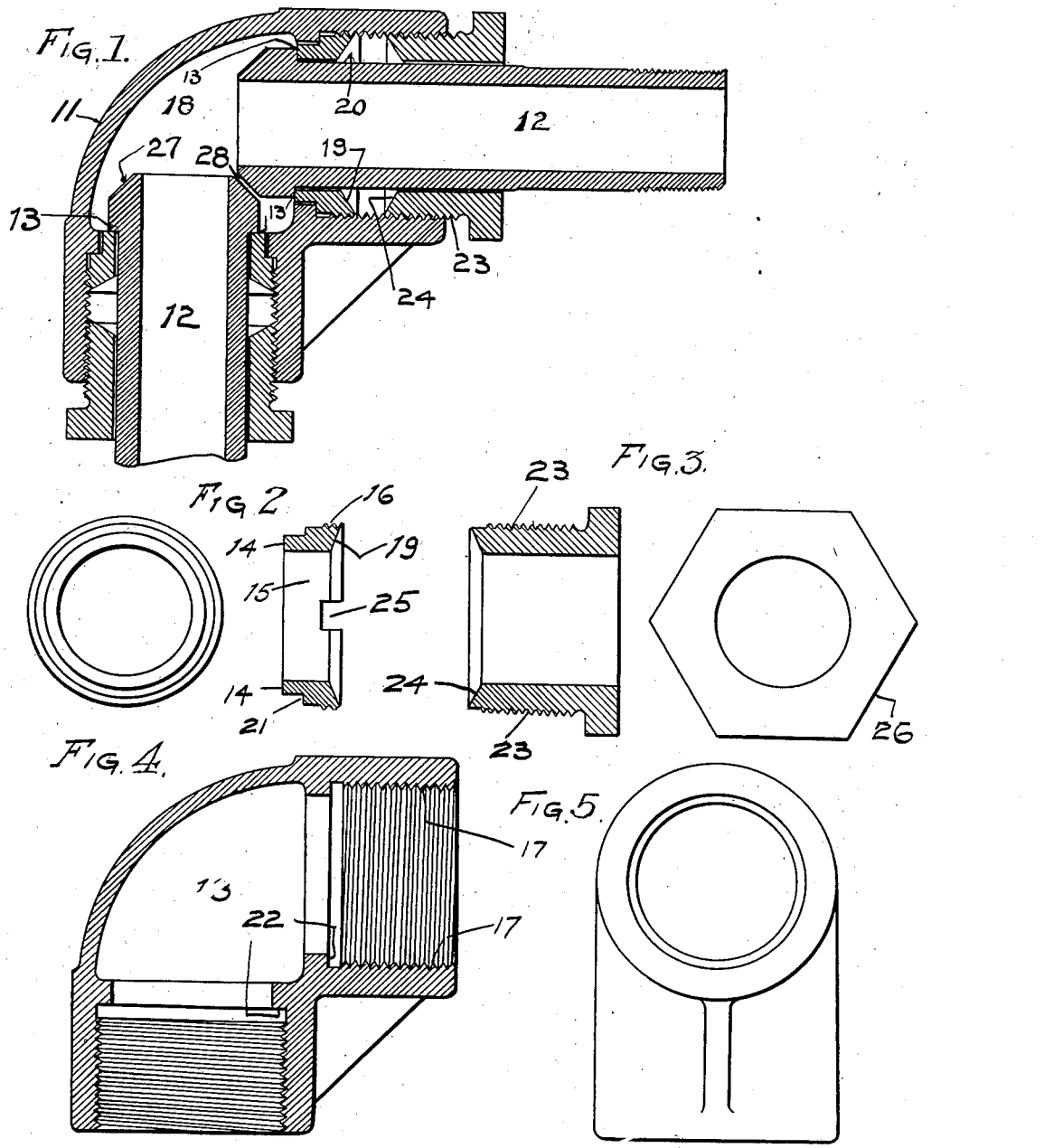

JOHN R. ALEXANDER, OF ALTOONA, PENNSYLVANIA.

FLEXIBLE METALLIC COUPLING.

1,111,283. Specification of Letters Patent. Patented Sept. 22, 1914.

Application filed January 22, 1912. Serial No. 672,622.

*To all whom it may concern:*

Be it known that I, JOHN R. ALEXANDER, a citizen of the United States, residing at Altoona, in the county of Blair and State of Pennsylvania, have invented certain new and useful Improvements in Flexible Metallic Couplings, of which the following is a specification.

This invention relates to the subject of flexible metallic couplings, designed to be used in connection with fluid, gas, steam or air pipes of a train of cars, or manufacturing plant, and has particularly in view an improved and practical means whereby the nipple, which extends into the elbow that comprises the body or casing for the joint, is provided with an abutting bevel surface so positioned that one of the nipples abuts against the other, thus limiting its movement in a very efficient and practical manner.

Another object of this invention is to provide means for positioning the nipple, such that its outward movement is prevented, while, at the same time, it is free to rotate on its own axis.

It will be readily understood that this flexible metallic coupling, and its appurtenances associated therewith, is readily adapted to all the uses that the usual hose couplings are designed to serve, and to substitute the metallic form for the usual hose form is but a matter of effecting a connection through the usual hose couplings.

With these and many other objects in view, which will be more readily apparent, as the nature of the invention is better understood, the same consists in the novel construction combination and arrangement of parts as will be hereinafter more fully illustrated, pointed out, and claimed.

It will be quite readily understood that the invention is naturally susceptible to a wide range of structural modification, without departing from the scope or spirit of the invention, but a preferred and practical embodiment thereof is shown in the accompanying drawings, in which:

Figure 1, is a cross-sectional view of one of the couplings used in connection with my invention, showing particularly the arrangement of automatic nipple stop, associated integral with the nipple. Fig. 2, is a front and edge view of the combined two diameter ring and collar seat. Fig. 3, is a sectional view, together with an end view of the externally threaded gland, used in connection with this invention. Fig. 4, is a cross-sectional view of the elbow construction used in connection with this invention. Fig. 5, is an end elevation of the elbow, shown in Fig. 4 of the drawings.

Like reference numerals indicate corresponding parts throughout the several figures of the drawings.

In carrying out the present invention, when applied to the air brake system of a train of cars, no change is contemplated in the usual form of air piping, either on the locomotive, tender, or car in a train of cars, but instead of the usual rubber hose between the various units of a train, the present invention is of special use in an all-metallic coupling, adapted to be interchangeable with the usual air brake hose.

To provide for the various movements, which a metallic hose coupling of this character is necessarily susceptible under service conditions, the joint 11 is provided with a plurality of swivel members 12, each having a collar 13 adapted to be engaged by a seat 14, which is made integral with the two diameter ring designated in its entirety by the numeral 15. The two diameter ring 15, consists essentially of an externally threaded portion 16, adapted to engage the internal threaded portion 17 of the casing 18, an angularly disposed face 19, adapted to act as an abutment for the packing and force the same down on the surface 20, of the nipple 12, and an abutment ledge 21 adapted to engage a corresponding ledge 22, in the casing 18. The ring 15, is preferably finished all over, and likewise its abutting surfaces in the casing, thus insuring a positive locking means which tends to keep the gland in place unaffected by the rotation of the collar 13 on its seat. The casing 18, is further provided with an externally threaded gland 23, having an angularly disposed inner face 24, which when coöperating with the angularly disposed face 19, serves to force the packing down on the external surface of the nipple, thus preventing, in a very practical way, the escape of pressure fluid, should the same escape between the collar and its seat, as already pointed out.

For the purpose of screwing the glands into position, the inner one 15, is provided with a notch 25, which is adapted to receive a tool for screwing the same into position. The outer gland is provided with a hexagonal portion 26, adapted to receive a wrench for screwing the same into position.

For the specific purpose of keeping the nipple 12 from passing too far into the casing, when assembling, or when in service, there is provided upon each nipple, a collar, the inner end of which is provided with an angularly disposed surface 27. When the various parts are assembled, a clearance space 28 is preferably provided between the two abutting surfaces of the collars, thus insuring perfect freedom of movement, while at the same time perfectly tight joints.

After having threaded the glands, internally threaded the casing, and finished the various parts and surfaces to size, the assembling may be accomplished as follows:—The combined two-diameter ring and gland 15, is placed over the shank of the nipple 12, and with a tool engaging the notch 25, the same is screwed into position, or until the shoulder 21 firmly abuts upon the ledge 22 in the casing. The nipple 12 is then drawn back into position, or until the collar 13 abuts upon the surface 14, of the two-diameter ring 15. Having thus first positioned the first nipple, together with its appurtenances, the second is positioned in the same manner.

Having thus described my invention, and believing the same can readily be understood, without further elaboration, what I claim and desire to secure by Letters Patent is;

A joint for flexible metallic couplings comprising an elbow casing having angularly related interiorly threaded necks and within said necks being provided with interior annular abutment seats, swivel pipe members loosely arranged within the angularly related necks and provided at their inner end portions with annular shoulders and with relatively broad beveled bearing faces, the said beveled bearing faces of the separate swivel pipe members being arranged in engaging relation, a collar element fitted into each neck and arranged to engage the annular shoulder of the swivel member therein, and an outer packing gland threaded at the outer end portion of each neck.

In testimony whereof I affix my signature in presence of two witnesses.

JOHN R. ALEXANDER.

Witnesses:
N. E. GEE,
J. T. HANLON.